United States Patent
George et al.

(10) Patent No.: US 8,838,818 B2
(45) Date of Patent: Sep. 16, 2014

(54) SYSTEM AND METHOD FOR ACCESSING FEATURES OFFERED BY AN APPLICATION SERVER

(75) Inventors: Richard George, Waterloo (CA); Brian Oliver, Fergus (CA); Andrew Allen, Mundelein, IL (US)

(73) Assignee: BlackBerry Limited, Waterloo (CA)

( * ) Notice: Subject to any disclaimer, the term of this patent is extended or adjusted under 35 U.S.C. 154(b) by 431 days.

(21) Appl. No.: 11/961,413

(22) Filed: Dec. 20, 2007

(65) Prior Publication Data

US 2009/0006638 A1    Jan. 1, 2009

Related U.S. Application Data

(60) Provisional application No. 60/947,244, filed on Jun. 29, 2007.

(51) Int. Cl.
- *G06F 15/16* (2006.01)
- *H04M 3/42* (2006.01)
- *H04L 29/08* (2006.01)
- *H04L 29/06* (2006.01)

(52) U.S. Cl.
CPC ........... *H04M 3/42178* (2013.01); *H04L 67/02* (2013.01); *H04L 65/1006* (2013.01); *H04M 2207/18* (2013.01); *H04M 2203/053* (2013.01)
USPC ........................... 709/230; 709/203; 709/217

(58) Field of Classification Search
CPC ...... H04L 65/40; H04L 65/1006; H04L 67/02
See application file for complete search history.

(56) References Cited

U.S. PATENT DOCUMENTS

| | | | |
|---|---|---|---|
| 6,108,406 | A | 8/2000 | Mitchell et al. |
| 6,496,865 | B1 | 12/2002 | Sumsion et al. |
| 6,549,937 | B1 | 4/2003 | Auerbach et al. |
| 6,594,700 | B1 | 7/2003 | Graham et al. |
| 6,757,722 | B2 | 6/2004 | Lonnfors et al. |
| 7,533,381 | B2 | 5/2009 | Ando |
| 7,584,244 | B2 | 9/2009 | Forstadius |
| 2002/0143641 | A1 | 10/2002 | Thomas et al. |

(Continued)

FOREIGN PATENT DOCUMENTS

| WO | 03/061242 A1 | 7/2003 |
|---|---|---|
| WO | 2004028090 | 4/2004 |
| WO | 2005/032090 A1 | 4/2005 |
| WO | 2006/071468 A2 | 7/2006 |

OTHER PUBLICATIONS

Supplementary European Search Report for European Patent Application No. 07855563.8 dated Jul. 16, 2009.

(Continued)

*Primary Examiner* — Thomas Dailey
*Assistant Examiner* — Nam Tran
(74) *Attorney, Agent, or Firm* — Novak Druce Connolly Bove + Quigg LLP

(57) ABSTRACT

Systems and methods are provided for accessing additional features offered by an application server. The additional features are generally regarded as being specific to the application server. According to an embodiment of the application, a communications device obtains information for accessing the additional features. The communications device accesses an additional feature by instructing the application server to execute the additional feature according to the information that has been obtained. In specific implementations, the information for accessing the additional features is provided by an Extensible Markup Language 'XML' file.

15 Claims, 4 Drawing Sheets

(56) References Cited

U.S. PATENT DOCUMENTS

| | | | |
|---|---|---|---|
| 2004/0111525 A1* | 6/2004 | Berkland et al. ............. | 709/231 |
| 2004/0267942 A1 | 12/2004 | Maes | |
| 2005/0055577 A1 | 3/2005 | Wesemann et al. | |
| 2005/0083916 A1* | 4/2005 | Itagaki et al. ................ | 370/352 |
| 2005/0091362 A1 | 4/2005 | Shigeta | |
| 2005/0117183 A1 | 6/2005 | Adlakha | |
| 2006/0129646 A1 | 6/2006 | Rhee et al. | |
| 2006/0140199 A1 | 6/2006 | Ma et al. | |
| 2006/0190526 A1 | 8/2006 | Neil et al. | |
| 2006/0190569 A1* | 8/2006 | Neil et al. ................... | 709/220 |
| 2006/0195613 A1 | 8/2006 | Aizu et al. | |
| 2007/0067471 A1 | 3/2007 | Wolfe et al. | |
| 2008/0250430 A1 | 10/2008 | Salgado | |
| 2009/0006637 A1 | 1/2009 | George | |
| 2009/0265434 A1 | 10/2009 | Benc et al. | |
| 2010/0259788 A1 | 10/2010 | Sakuda et al. | |
| 2010/0325609 A1 | 12/2010 | Windley | |

OTHER PUBLICATIONS

Rosenberg, J., Schulzrinne, H., Camarillo, G., Johnston, A., Peterson, J., Sparks, R., Handley, M., and E. Schooler, "SIP: Session Initiation Protocol", RFC 3261, Jun. 2002, total of 240 pages. Retrieved from ftp://ftp.rfc-editor.org/in-notes/rfc3261.txt on Sep. 24, 2007.

JAVA Telephony Specification (JTAPI) 1.3, total of 1191 pages. Retrieved from http://java.sun.com/products/jtapi/index.jsp on Jun. 13, 2007.

Voice Browser Call Control: CCXML Version 1.0, total of 205 pages. Retrieved from http://www.w3.org/TR/ccxml on Jun. 13, 2007.

Bushmitch et al., "A SIP-based Device Communication Service for OSGi Framework," First IEEE Consumer Communications and Networking Conference, Jan. 5-8, 2004, pp. 453-458.

Office Action dated Oct. 23, 2009 from related U.S. Appl. No. 11/961,374.

European Search Report and European Search Opinion that issued on Nov. 30, 2009 from related European Patent Application No. 07855562.0.

Heidi-Maria Rissanen et al: "Design and Implementation of a RESTful IMS API", Wireless and Mobile Communications (ICWMC), 2010 6th International Conference on, IEEE, Piscataway, NJ, USA. Sep. 20, 2010, pp. 86-91, XP031795973, ISBN: 978-1-4244-8021-0.

Jain M et al: "The IMS 2.0 Service Architecture", Next Generation Mobile Applications, Services and Technologies, 2008. NGMAST '08. The Second International Conference ON, IEEE, Piscataway, NJ, USA, Sep. 16, 2008, pp. 3-9, XP031409648, ISBN: 978-0-7695-3333-9.

Extended European Search Report dated Feb. 22, 2013 from European Application No. EP 12 15 3949.8.

Office Action dated Oct. 6, 2010 from related U.S. Appl. No. 11/961,374.

English-language translation of an Office Action dated Aug. 24, 2011 from related Chinese Patent Application No. 200780036636.X.

\* cited by examiner

SYSTEM AND METHOD FOR ACCESSING FEATURES OFFERED BY AN APPLICATION SERVER

RELATED APPLICATION

This application claims benefit from U.S. Provisional Patent Application No. 60/947,244 filed on Jun. 29, 2007, the disclosure of which is hereby incorporated by reference in its entirety.

FIELD OF THE APPLICATION

The application relates to communication protocols, and more particularly to accessing communication features offered by an application server using a communication protocol.

BACKGROUND OF THE APPLICATION

Many enterprises are replacing their existing CENTREX (Central Exchange) or PBX (Private Branch Exchange) based telephony systems with VoIP (Voice over IP (Internet Protocol)) systems based upon SIP (Session Initiation Protocol) signalling systems. Such systems utilize existing IP infrastructure based upon LAN (Local Area Network) and WLAN (Wireless Local Area Network) technologies.

At the same time, mobile phones that use Cellular networks such as GSM (Global System for Mobile Communications), CDMA (Code Division Multiple Access) and UMTS (Universal Mobile Telecommunications System), to conduct communications with others inside and outside the enterprise network, are being enhanced to provide SIP based communications, including VoIP, over WLAN access, allowing these devices to provide mobile telephony communication capability when within the enterprise network as well as when away from the enterprise network.

Although systems based on SIP are being widely deployed as the common signalling protocol for VoIP telephony, there is a lack of standardization in the way SIP is utilized. Also, the protocol continues to be developed further with continued introduction of new extensions to SIP. This has led to different versions of SIP with significant differences in the way they are used. These differences include the usage of different SIP headers for conveying the same information or to trigger the same action, different call scenarios (different message sequences) for the same call setup or call feature, the use of proprietary or pre-standard SIP headers, and the use of new extensions to the SIP standards.

These differences create a problem for manufacturers of mobile devices such as mobile phones. Mobile phones manufactured with a version of SIP software that implements an early version of SIP may be sold and attempted to be used on a network that requires a version of SIP software that implements a later SIP standard. It may not be economically viable for vendors of such mobile devices to produce different SIP software for every potentially deployed network SIP usage.

As new application servers are introduced with new features, and as new features are added to existing application servers, it becomes difficult to update mobile devices to allow them to access these new features without issuing many new versions of the software. Every time a new version of the software is issued the user runs some upgrade program, which is both open for error and a distraction to the user. It is often the case that users don't upgrade, and so the new features do not get used. Also, unless many parallel versions of the software are maintained, the software is to support all features on all application servers. This can make the software larger and more complex leading to more software error opportunities, and making control of what features a single user may use more complex. If the parallel software version technique is used, then there are management issues for the development, testing, distribution and control of these parallel versions.

BRIEF DESCRIPTION OF THE DRAWINGS

Embodiments will now be described with reference to the attached drawings in which.

DETAILED DESCRIPTION OF EMBODIMENTS

Hard coding information on how to access additional features offered by each application server is possible. However, this is not a practical solution because the number of additional features for each application server can be numerous and are generally application server specific. Software that hard codes the information on how to access additional features offered by each application server could succumb to frequent revisions in order to properly support the additional features for each application server. Some embodiments of the application provide for a system and method for obtaining information for accessing additional features. Accessing additional features is performed based on the information that has been obtained. Therefore, there is no need to hard code the information for accessing the additional features.

According to a broad aspect of the application, there is provided a method in a communications device comprising: the communications device accessing first features offered by an application server using a communication protocol; the communications device obtaining information for accessing at least one additional feature offered by the application server for which the communications device was not previously configured to access; and the communications device accessing an additional feature of the at least one additional feature by instructing the application server to execute the additional feature according to the information that has been obtained; wherein the information comprises a non-executable editable file that describes how to access the at least one additional feature offered by the application server.

According to another broad aspect of the application, there is provided a computer readable medium having computer executable instructions stored thereon for execution on a processor so as to implement the method summarised above.

According to another broad aspect of the application, there is provided a communications device comprising: a processor; and a feature accessing function for: accessing first features offered by an application server using a communication protocol; obtaining information for accessing at least one additional feature offered by the application server for which the communications device was not previously configured to access; and accessing an additional feature of the at least one additional feature by instructing the application server to execute the additional feature according to the information that has been obtained; wherein the information comprises a non-executable editable file that describes how to access the at least one additional feature offered by the application server.

System for Accessing Additional Features

Figure 1:
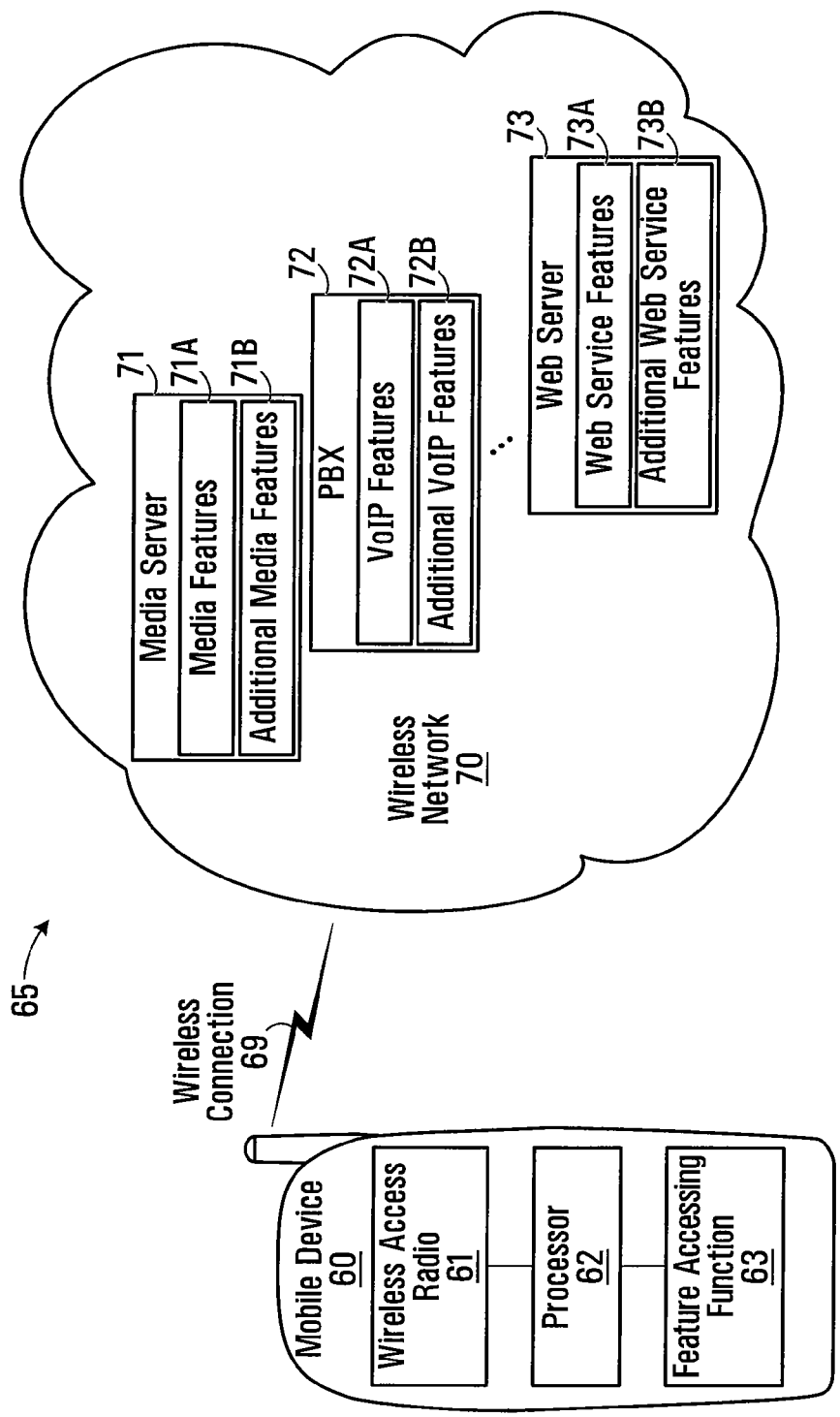
FIG. 1 is a block diagram of an example wireless system.

Referring now to FIG. 1, shown is a block diagram of an example wireless system 65. The wireless system 65 has a wireless network 70 and a mobile device 60. There may be other mobile devices, but they are not shown for sake of simplicity. The mobile device 60 has a processor 62 connected to a wireless access radio 61 and a feature accessing function 63. The connections between the processor 62 and the other components 61, 63 may be direct connections or indirect connections in which there is one or more intervening component (not shown). The mobile device 60 may have other components, but they are not shown for sake of simplicity. The wireless network 70 has a plurality of application servers 71, 72, 73 and may have other application servers and/or other components, but they are not shown for sake of simplicity. In the illustrated example, the application servers 71, 72, 73 include a media server 71, a PBX 72, and a web server 73. The media server 71 has media features 71A, and additional media features 71B. The PBX 72 has VoIP features 72A, and additional VoIP features 72B. The web server 73 has web service features 73A, and additional web service features 73B.

In operation, the mobile device 60 communicates with the wireless network 70 using its wireless access radio 61. The wireless communication is over a wireless connection 69 between the mobile device 60 and the wireless network 70. The communication with the wireless network 70 might for example be between the mobile device 60 and one of the application servers 71, 72, 73. In the illustrated example, it is assumed that the mobile device 60 is involved in a SIP call with the media server 71. During the SIP call, the mobile device 60 can access the media features 71A offered by the media server 71 using a typical SIP. However, the mobile device 60 might not be able to access the additional media features 71B offered by the media server 71 using the typical SIP. This is because the additional media features 71B are specific to the media server 71. The manner in which the additional media features 71B are to be accessed might be unknown to the mobile device 60. Prior to becoming configured in the manner detailed below, the mobile device 60 is not configured to access the additional media features 71B. Note that the other application servers 72,73 similarly have additional features 72B, 73B that are application server-specific.

According to an embodiment of the application, the feature accessing function 63 of the mobile device 60 obtains information for accessing the additional media features offered by the media server 71 for which the mobile device 60 was not previously configured to access. The information might for example be obtained directly from the media server 71. Once the information is obtained, the feature accessing function 63 of the mobile device 60 is configured for accessing the additional media features 71B. The mobile device 60 instructs the media server 71 to execute a selected additional feature according to the information that has been obtained. This might involve the mobile device using the same SIP, but in a manner for which the mobile device 60 was previously not configured to use. Alternatively, might involve the mobile device using an extension of the SIP in accordance with the information that has been obtained. In any case, the selected additional feature is executed by the media server 71.

There are many possibilities for the media features 71A and the additional media features 71B offered by the media server 71. The media features 71A might for example include a video sharing application, a web conference application, etc. The additional media features 71B might for example include a whisper feature, which provides a way for an Executive Assistant (EA) to break into a conversation between the Executive and a third party in such a way that the Executive will hear the EA but the third party will not while the conversation between the executive and the third party continues undisturbed. Some additional features might for example include one or more of group calling, handling multiple calls, and forwarding. It is to be understood that numerous other additional features are possible.

Note that the additional features 72B, 73B of the other application servers 72, 73 might be quite different, and might be accessed using a different type of communication protocol altogether. For instance, the additional features offered by the web server 73 include web service-based features 73B, which are accessed using a Hypertext Transfer Protocol 'HTTP'. Other possible communication protocols for accessing various additional features include a SIP, a SOAP, a Remote Method Invocation 'RMI', Remote Procedure Call 'RPC', a Computer Telephony Interface 'CTI', an ECMA 323, web service protocol, a Media Server Markup Language 'MSML', a Telephony Application Programming Interface 'TAPI', a Java Telephony Application Programming Interface 'JTAPI', and any appropriate proprietary protocol.

In the illustrated example, the feature accessing function 63 is implemented as software and is executed on the processor 62. However, more generally, the feature accessing function 63 may be implemented as software, hardware, firmware, or any appropriate combination thereof. In some implementations, the feature accessing function 63 is provided with protocol libraries that provide basic building blocks for using communication protocols, for example when accessing the media features 71A. Alternatively, the basic building blocks for using communication protocols may be implemented in any appropriate manner, or provided to the feature accessing function 63 by some component external to the feature accessing function 63.

In specific software implementations, the JAVA programming language and the JAVA Application Programmer Interface (API) are used. This allows Call Processing Applications to be developed that can run on multiple platform architectures and that can run using different call signalling protocols. For example, the Java Telephony API (JTAPI) 1.3 provides a set of APIs that can be used to implement both the basic call model and also advanced call features. Other software implementations can include C, C++, Pascal, Perl, etc. Note that software implementations can be compiled (e.g. C, C++, Pascal), or interpretative (e.g. Perl).

The illustrated example presented above with reference to FIG. 1 involves a wireless network. It is to be understood that the wireless network would have any appropriate components suitable for a wireless network. Note that the wireless network may include wires in spite of having components for wireless communication. The components of the wireless network are implementation specific and may depend on the type of wireless network. The wireless network might for example be a Data Wide Network, an 802.11 Wireless Fidelity 'Wi-Fi' network, an 802.16 Worldwide Interoperability for Microwave Access 'WIMAX' network, or a cellular network. Examples of appropriate cellular networks include an Enhanced Data rates for GSM Evolution 'EDGE' network, a Code Division Multiple Access 'CDMA' network, and a Universal Mobile Telecommunications System 'UMTS' network. Although the examples focus on wireless communication, it is to be understood that embodiments of the invention are also applicable to non-wireless communication systems. In such embodiments, communication devices may be provided in place of mobile devices. Note that there is no need for such communication devices to have wireless access radios for wireless communication.

Further details of accessing additional features are provided below with reference to FIG. 2.

Method for Accessing Additional Features

Figure 2:
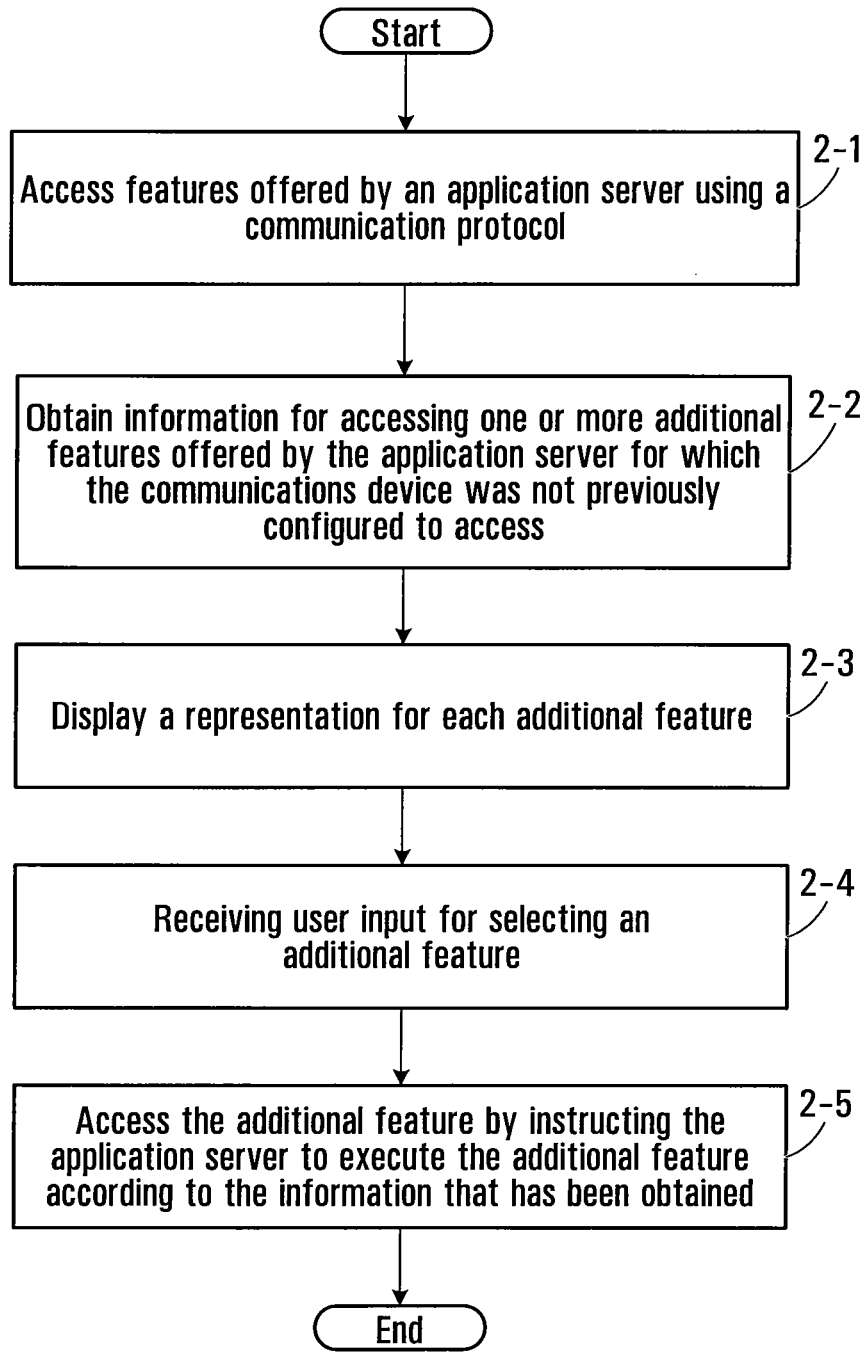
FIG. 2 is a flowchart of an example method of accessing additional features offered by an application server.

Referring now to FIG. 2, shown is a flowchart of an example method of accessing additional features offered by an application server. This method may be implemented in a communications device, for example by the feature accessing function 63 of the mobile device 60 shown in FIG. 1. More generally, this method may be implemented in any appropriate communications device regardless of whether the communications device is wireless.

At step 2-1, the communications device accesses features offered by an application server using a communication protocol. The features might for example be media features that are accessed using a standard SIP. At step 2-2, the communications device obtains information for accessing one or more additional features offered by the application server for which the communications device was not previously configured to access. In some implementations, as indicated at step 2-3, the communications device displays a representation for each additional feature. The communications device might for example display one or more menus within a Graphic User Interface 'GUI' based on the information. In some implementations, this involves dynamically updating an existing GUI (e.g. text and/or graphics) so as to display the representation for each of the at least one additional feature. This allows the user to view the additional features and make a selection. At step 2-4, the communications device receives user input for selecting one of the additional features. At step 2-5, the communications device accesses the additional feature by instructing the application server to execute the additional feature according to the information that has been obtained. This might involve the communications device using the same communication protocol, but in a manner for which the communications device was previously not configured to use. Alternatively, might involve the communications device using an extension of the communication protocol in accordance with the information that has been obtained.

There are many possibilities for the information for accessing the additional features. In some implementations, the information is provided by a non-executable editable file that describes how to access the additional features offered by the application server and is stored on the communications device. The non-executable editable file typically uses a non-programming language, for example a markup language. The non-executable editable file might for example be an XML file, which might be used to describe the network addresses and ports at which the new feature may be located, the specific protocol steps used to access the new feature, the contents of the individual signals that are part of the protocol, modifications to the protocol such as new custom headers or values, and/or additions to the menus offered to the user that are used to access the new feature. Note that non-executable editable files such as XML files can be edited by an administrator on the network side without having to change any compiled software resident on the communications device. The format of the non-executable editable file is such that programming knowledge is not required to enable a communications device to access a new feature on an application server and thus may be done by staff not skilled in programming communications devices. In some implementations, the communications device downloads the non-executable editable file from a distribution point on the network. In other implementations, the communications device automatically receives the non-executable editable file as a push from the network. Other implementations are possible.

In some implementations, the communications device receives additional information for displaying a representation of the additional features. In some implementations, the additional information for displaying the representation of the additional features is received together with the information for accessing the additional features. For example, in specific implementations, an XML file is received that includes both the information for accessing the additional features and the information for displaying a representation of the additional features. The information for displaying a representation of the additional features might for example include information for displaying a menu for identifying the additional features. The menu might be a new menu altogether, or form part of an existing menu. In other implementations, the additional information for displaying the representation of the additional features is received separately from the information for accessing the additional features. Other implementations are possible.

In the examples present above with reference to FIG. 2, the application server involved in the communication might for example be a media server. In this case, the communication protocol would be based on SIP. Alternatively, the application server involved in the communication might be a PBX. In this case, the communication protocol would also be based on SIP. Alternatively, application server involved in the communication might be a web server. In this case, the communication protocol would be a Hypertext Transfer Protocol 'HTTP'.

GUI for Accessing Additional Features

Figure 3:
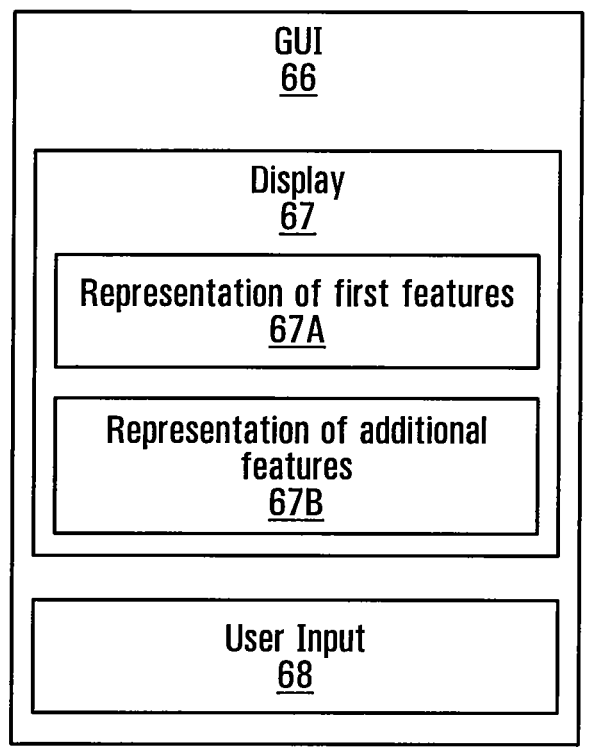
FIG. 3 is a block diagram of an example Graphic User Interface 'GUI' of a communications device.

Referring now to FIG. 3, shown is a block diagram of an example GUI 66 of a communications device (not shown). The GUI 66 might form part of any appropriate communications device, for example the mobile device 60 shown in FIG. 1. The GUI 66 has a display 67, which might for example include one or more of a Liquid Crystal Display 'LCD', a Light Emitting Diode 'LED', or any other appropriate display device. The GUI 66 also has a user input 68, which might for example include one or more of a keypad, a scroll wheel, a button, and any other appropriate input device. The GUI 66 may have other components, but they are not shown for sake of simplicity.

In operation, the display 67 displays a representation of first features 67A offered by an application server. The first features are not generally considered to be specific to the application server, as other application servers offer the first features. In this example it is assumed that the application server also offers additional features, which are generally considered to be specific to the application server. Upon the communications device obtaining information for accessing the additional features for which the communications device was not previously configured to access, the display 67 displays a representation of the additional features 67B. Therefore, the display displays a representation of all features 67A, 67B (i.e. both the first features 67A and the additional features 67B).

A user can view the features offered by the application server by viewing the display 67. Once the user decides which feature the communications device should access, the user uses the user input 68 to select a selected feature. The selected feature is selected so that the communications device accesses the selected feature. If the selected feature is one of the first features, then the communications device instructs the applications server to execute the selected feature using a typical communication protocol. However, if the selected feature is one of the additional features for which the communications device was not previously configured to access, then the communications device instructs the applications server to execute the selected feature in accordance with the information that has been obtained. This might involve the communications device using the same communications protocol, but in a manner for which the communications device was previously not configured to use. Alternatively, this might involve the communications device using an extension of the communications protocol in accordance with the information that has been obtained.

There are many possibilities for the information for accessing the at least one additional feature. Examples have been provided above and are therefore not repeated here. For implementations where the information is provided by an XML file, the representation of the at least one additional feature 67B that is displayed by the display 67 might for example include a menu. In some implementations, the XML file provides both the information for accessing the additional features and additional information for displaying a representation for the additional features. In this case, the XML file provides the information used for displaying the menu, which allows the user to select an additional feature. Other implementations are possible.

Another Mobile Device

Figure 4:
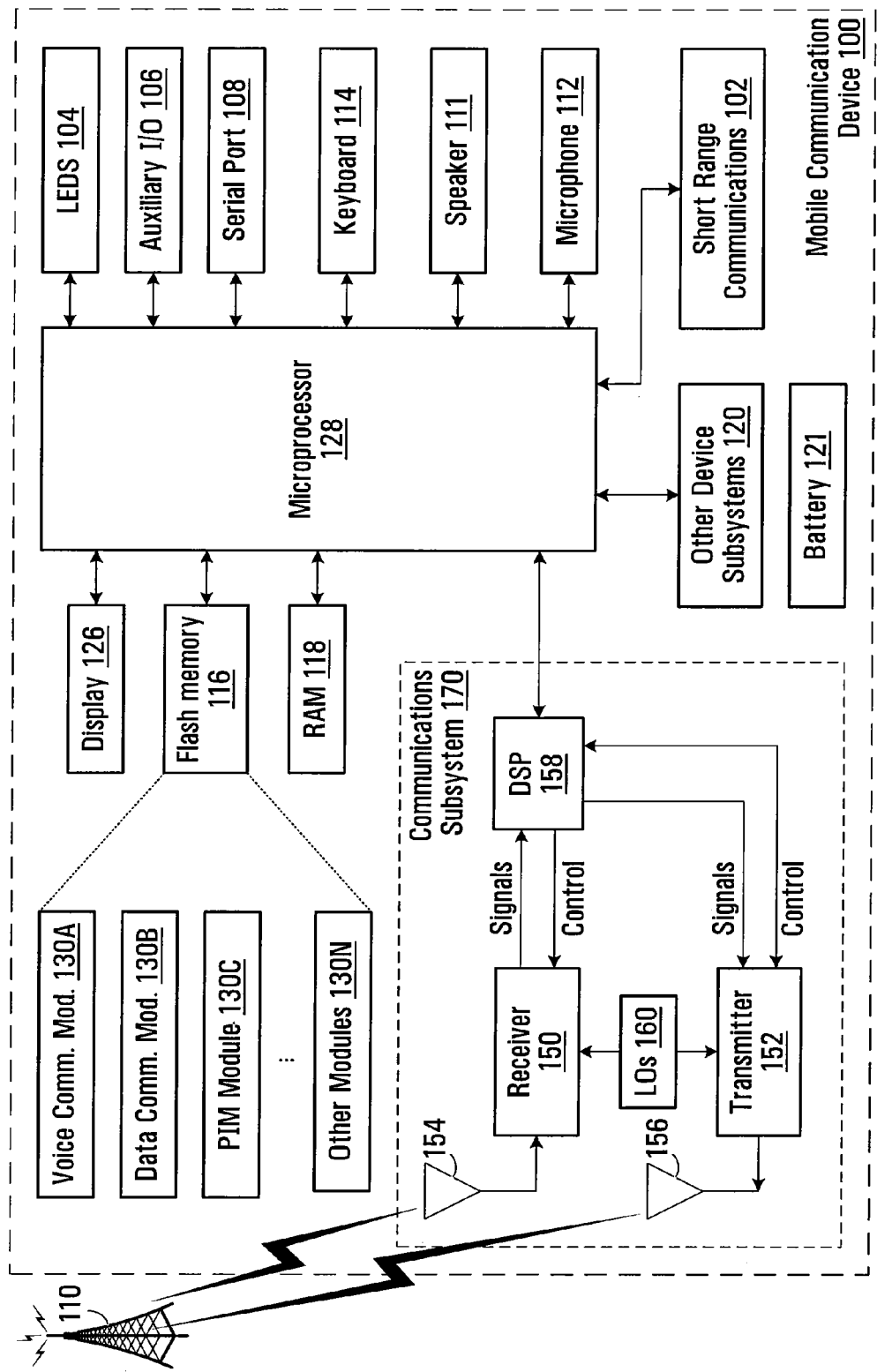
FIG. 4 is a block diagram of a mobile device.

Referring now to FIG. 4, shown is a block diagram of another mobile device 100 that may implement any of the mobile device methods described herein. The mobile device 100 is shown with specific components for implementing features similar to those of the mobile device 60 of FIG. 1. It is to be understood that the mobile device 100 is shown with very specific details for illustrative purposes only.

A processing device (a microprocessor 128) is shown schematically as connected between a keyboard 114 and a display 126. The microprocessor 128 is a type of processor with features similar to those of the processor 62 of the mobile device 60 shown in FIG. 1. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture. One or more of the modules 130A, 130B, 130C, 130N of the flash memory 116 can be configured for implementing features similar to those of the feature accessing function 63 of the mobile device 60 shown in FIG. 1.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 61 of the mobile device 60 shown in FIG. 1. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present application are possible in light of the above teachings. It is therefore to be understood that within the scope of the appended claims, the application may be practised otherwise than as specifically described herein.

We claim:

1. A method in a communications device comprising:
the communications device accessing first features offered by an application of an application server from a plurality of application servers using a session communication protocol;
the communications device obtaining a non-executable editable file that comprises (a) first information describing how to access at least one additional feature offered by the application of the application server for which the communications device was not previously configured to access and where the additional feature is specific to the application server and (b) second information describing how to represent the at least one additional feature;
the communications device dynamically updating an existing Graphic User Interface 'GUI' so as to display a representation of the at least one additional feature offered by the application, in accordance with the second information;
the communications device receiving input for selecting an additional feature of the at least one additional feature offered by the application via the GUI that has been dynamically updated; and
the communications device accessing the additional feature offered by the application without having to change any compiled software on the communications device by using the session communication protocol in a manner for which the communications device was not previously configured to use or by using an extension of the session communication protocol in accordance with the first information.

2. The method of claim 1 wherein the non-executable editable file is an Extensible Markup Language 'XML' file.

3. The method of claim 1 wherein the application server is a media server, the at least one additional feature being at least one additional media feature, the session communication protocol being based on Session Initiated Protocol 'SIP'

4. The method of claim 1 wherein the application server is a Private Branch eXchange 'PBX', the at least one additional feature being at least one additional Voice over Internet Protocol 'VoIP'-based feature, the session communication protocol being based on SIP.

5. The method of claim 1 wherein obtaining the non-executable editable file comprises at least one of: downloading the non-executable editable file, and automatically receiving the non-executable editable file.

6. The method of claim 1 wherein the communications device dynamically updates the existing GUI upon obtaining the non-executable editable file.

7. The method of claim 1 wherein the communications device is a mobile device.

8. A non-transitory computer readable medium having computer executable instructions stored thereon for execution on a processor so as to implement the method of claim 1.

9. A communications device comprising:
a processor; and
a feature accessing function configured for:
accessing first features offered by an application of an application server from a plurality of application servers using a session communication protocol;
obtaining a non-executable editable file that comprises (a) first information describing how to access at least one additional feature offered by the application of the application server for which the communications device was not previously configured to access and where the additional feature is specific to the application server and (b) second information describing how to represent the at least one additional feature;
dynamically updating an existing Graphic User Interface 'GUI' so as to display a representation of the at least one additional feature offered by the application, in accordance with the second information;
receiving input for selecting an additional feature of the at least one additional feature offered by the application via the GUI that has been dynamically updated; and
accessing the additional feature offered by the application without having to change any compiled software on the communications device by using the session communication protocol in a manner for which the communications device was not previously configured to use or by using an extension of the session communication protocol in accordance with the first information.

10. The communications device of claim 9 wherein the communications device is a mobile device, the mobile device comprising a wireless access radio.

11. The communications device of claim 9 wherein the non-executable editable file is an Extensible Markup Language (XML) file.

12. The communications device of claim 9 wherein the application server is a media server, the at least one additional feature being at least one additional media feature, the session communication protocol being based on SIP.

13. The communications device of claim 9 wherein the application server is a Private Branch eXchange 'PBX', the at least one additional feature being at least one additional Voice over Internet Protocol 'VoIP'-based feature, the session communication protocol being based on SIP.

14. The communications device of claim 9 wherein obtaining the non-executable editable file comprises at least one of: downloading the non-executable editable file, and automatically receiving the non-executable editable file.

15. The communications device of claim 9 wherein the communications device dynamically updates the existing GUI upon obtaining the non-executable editable file.

* * * * *